United States Patent
Lauria et al.

(10) Patent No.: US 10,049,244 B2
(45) Date of Patent: Aug. 14, 2018

(54) MOTION-CONTROLLED ARRANGEMENT FOR, AND METHOD OF, LOCATING TARGETS WITH IMPROVED PERFORMANCE IN A VENUE

(71) Applicant: SYMBOL TECHNOLOGIES, LLC, Lincolnshire, IL (US)

(72) Inventors: Charles Lauria, Miller Place, NY (US); Richard J. Lavery, Huntington, NY (US); Russell E. Calvarese, Stony Brook, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/163,862

(22) Filed: May 25, 2016

(65) Prior Publication Data
US 2017/0344773 A1 Nov. 30, 2017

(51) Int. Cl.
| | |
|---|---|
| G06K 7/10 | (2006.01) |
| H04W 4/80 | (2018.01) |
| H04L 29/08 | (2006.01) |
| H04L 12/851 | (2013.01) |

(52) U.S. Cl.
CPC ..... *G06K 7/10475* (2013.01); *G06K 7/10366* (2013.01); *G06K 7/10425* (2013.01); *H04L 47/24* (2013.01); *H04L 67/12* (2013.01); *H04W 4/80* (2018.02)

(58) Field of Classification Search
CPC .............. G08B 13/248; G08B 13/1436; G08B 13/19673; G08B 13/19695; G08B 13/19697; G08B 13/2454; G08B 13/2462; G08B 13/2488; G08B 21/0261; G08B 21/0275; G06K 7/10108; G06K 7/10366; G06K 7/10009; G06K 7/10356; G06K 9/32; A63F 13/428; A63F 2300/105; B60R 25/33; G01C 21/206; G01P 13/00; G01S 13/56; G01S 13/84; G01S 2013/466; G01S 2013/468; G01S 5/0009; G01S 5/0294; G06F 3/0346; G06F 3/038; G06T 13/20; G06T 7/20; G07C 5/008; G07C 5/085; H04W 64/00
See application file for complete search history.

(56) References Cited

U.S. PATENT DOCUMENTS

| | | | |
|---|---|---|---|
| 8,384,665 B1 * | 2/2013 | Powers, III | A63F 13/06 345/156 |
| 8,681,005 B2 | 3/2014 | Austin et al. | |
| 8,855,671 B1 * | 10/2014 | Mirov | H04W 64/00 455/404.2 |
| 9,213,873 B2 * | 12/2015 | Austin | G06K 7/10108 |
| 9,311,799 B2 * | 4/2016 | Jain | G08B 13/248 |
| 9,530,034 B2 * | 12/2016 | Ainasoja | G06K 7/10861 |
| 2006/0055564 A1 * | 3/2006 | Olsen | B60R 25/1004 340/994 |

(Continued)

*Primary Examiner* — Fekadeselassie Girma
(74) *Attorney, Agent, or Firm* — Yuri Astvatsaturov

(57) ABSTRACT

Multiple sensing network units are deployed overhead in a venue. Each unit supports a motion detecting system for detecting a level of motion in a zone of the venue, and an RFID locationing system for reading RFID tags in the venue, in response to the motion level detected by the motion detecting system. The performance of the RFID locationing system is adjusted and optimized in response to the detected motion level.

15 Claims, 4 Drawing Sheets

(56) References Cited

U.S. PATENT DOCUMENTS

| | | | |
|---|---|---|---|
| 2009/0322489 A1* | 12/2009 | Jones | G06K 9/00771 340/10.3 |
| 2012/0075101 A1* | 3/2012 | Austin | G01P 13/00 340/572.1 |
| 2012/0306651 A1* | 12/2012 | Hall | G08B 13/19673 340/572.1 |
| 2013/0099927 A1* | 4/2013 | Kulinets | G01S 5/0009 340/572.1 |
| 2015/0186700 A1* | 7/2015 | Nikitin | G06K 7/10009 340/10.1 |
| 2015/0199696 A1* | 7/2015 | Carrender | G06Q 30/0201 705/7.29 |
| 2016/0371630 A1* | 12/2016 | Jetcheva | G06Q 10/087 |

* cited by examiner

MOTION-CONTROLLED ARRANGEMENT FOR, AND METHOD OF, LOCATING TARGETS WITH IMPROVED PERFORMANCE IN A VENUE

BACKGROUND OF THE INVENTION

The present disclosure relates generally to a motion-controlled arrangement for, and a method of, reading radio frequency (RF) identification (RFID) tags in a venue in real time with an enhanced performance, especially for rapidly and accurately locating and tracking RFID tags associated with items of interest for inventory control.

It is known to deploy a radio frequency (RF) identification (RFID) system in a retail, factory, or warehouse environment, or a like controlled area or venue, for product locationing, product tracking, product identification, and inventory control. For example, in order to take an inventory of items associated with RFID tags in a warehouse environment or venue, it is known to position a plurality of RFID tag readers at overhead, fixed locations, on the ceiling, or at doorways, loading docks, and assembly lines, in the venue, and then, to operate each such reader, under the control of a network host computer or server, to form and steer an interrogation beam, both in azimuth, e.g., over an angle of 360 degrees around a vertical axis, and in elevation, e.g., over an angle of about 90 degrees away from the vertical axis, over a coverage range across any such tags to read their payloads. Each RFID tag is usually attached to, or associated with, an individual item, or to a package for the item, or to a pallet or container for multiple items, or to a freight mover, such as a forklift or truck, for moving such items, packages, or pallets in the venue. Each RFID tag typically includes a tag antenna, a power management section, a radio section, and frequently a logic section, a memory, or both. A multitude of such tags may be in the coverage range of each RFID reader.

In brief, each RFID reader transmits an RF interrogating signal, and each RFID tag, which senses the interrogating RF signal, responds by transmitting a return RF signal. Each RFID tag either generates the return RF signal originally, or reflects back a portion of the interrogating RF signal in a process known as backscatter. The return RF signal may further encode data stored internally in the tag. The return signal is demodulated and decoded into identification data (also known as the payload) by each reader, which thereby identifies, counts, or otherwise interacts with the associated item. The decoded data can denote a serial number, a price, a date, a destination, a location, other attribute(s), or any combination of attributes, and so on. A specific location of any particular RFID-tagged item in the venue is typically determined by having the server process the payloads and capture data from a plurality of such RFID readers by using triangulation/trilateration techniques known in the art.

As advantageous as such known RFID systems have been in identifying, locating and tracking items with RFID tags, especially low-cost passive tags, it has proven difficult in practice to accurately and rapidly locate each tag, especially when one or more of the tags have moved, as well as when there is a multitude, e.g., a tag population of many thousands, of such tags in the venue. In addition, the venue itself has structures, such as shelving and like fixtures, as well as walls, the floor and the ceiling, and even people and moving equipment, all of which and more can reflect and/or scatter and/or absorb the RF signals, thereby causing the RF signals to travel along multiple, disrupted, folded paths and negatively impacting the travel of the RF signals between the RFID tags and the RFID reader. Each RFID reader reads at a certain read rate, for example, about 100-200 tags per second, and it takes a certain, non-negligible amount of time to read an entire tag population. Sometimes, each RFID reader has to read an individual tag more than once to accurately determine its location. When an RFID-tagged item has moved, i.e., when its location has changed to a new location, the time that it takes to provide an update of its new location is negatively affected by the presence of a large number of other tags. It is not always possible to know, at least not immediately, when a particular tag has moved, because the system must typically identify and locate all the tags before it can determine whether any particular tag has moved. The amount of time it takes to determine the new location of a tag that has moved is a linear function of the number of the tags within the coverage range of the reader (s). Real time reading performance, on the order of one second or less, for rapidly determining the new location of a tag that has moved, or for accurately locating any particular tag, is a challenge that known RFID systems have not always adequately met.

To improve the locating of the RFID tags, it is known to utilize a phased antenna array in the RFID system. However, this requires the addition of expensive hardware. It is further known to deploy a video or surveillance system in the venue by positioning a plurality of video cameras throughout the venue. Each video camera is operated to capture and record video streams of images of targets, such as the RFID tags, and to process these video streams to provide additional control, information, and feedback to the RFID system to improve its performance in locating the RFID tags. However, this not only requires the addition of expensive hardware, but also requires additional video processing server resources to process the video streams, and also utilizes excessive server bandwidth.

Accordingly, there is a need to more accurately and rapidly locate such tags, especially in a large RFID tag population, to conserve server bandwidth and video processing server resources, and to enhance the reading performance of such RFID systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
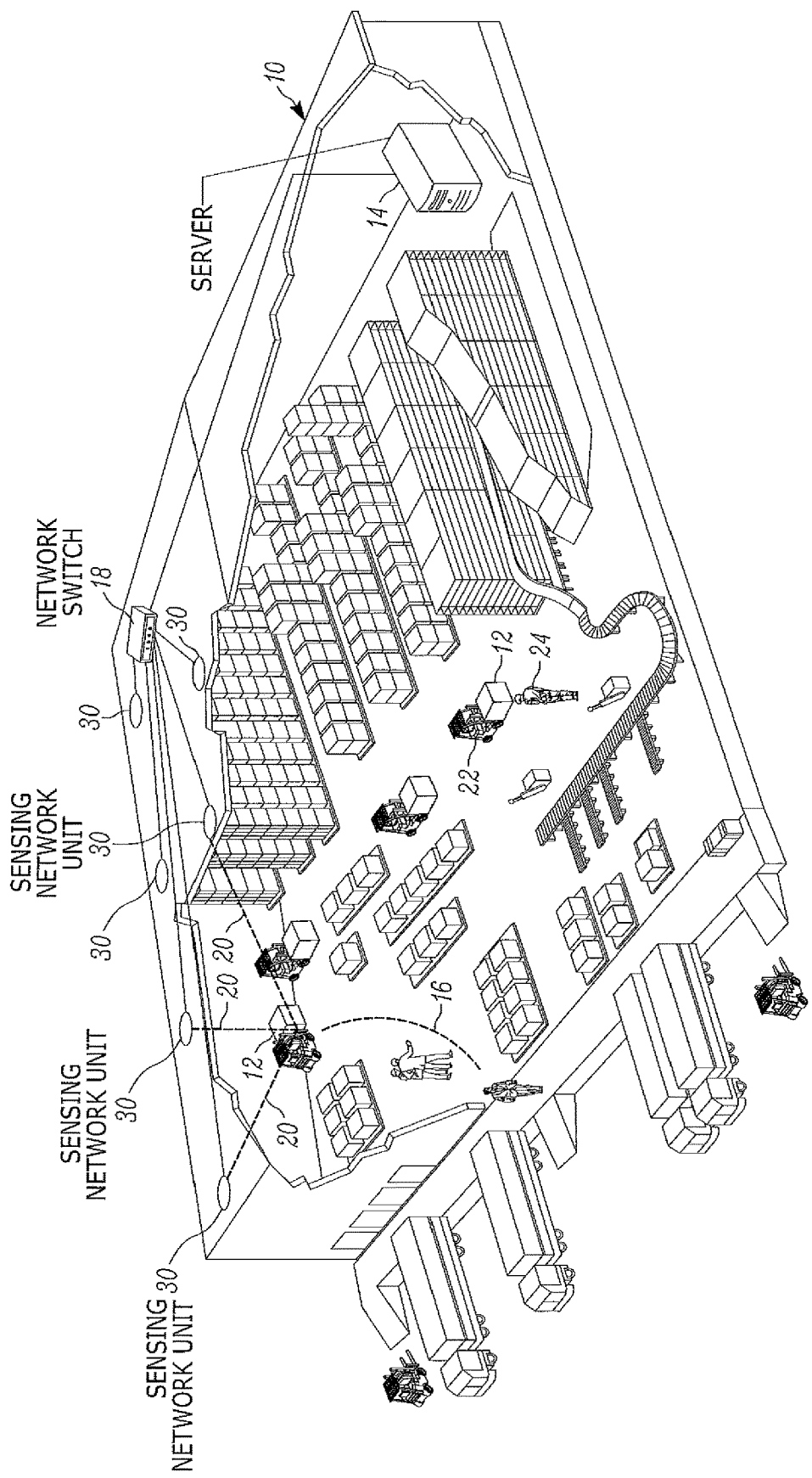
FIG. 1 is a broken-away, perspective view, as seen from above, of a motion-controlled arrangement of multiple, overhead, sensing network units deployed in a warehouse venue in accordance with the present disclosure.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The arrangement and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of this disclosure relates to a motion-controlled arrangement for locating targets with improved performance in a venue, such as a retail, factory, or warehouse environment, having a plurality of zones. The arrangement includes a housing mounted overhead in the venue, a motion detecting system supported by the housing, and a radio frequency (RF) identification (RFID) locationing system also supported by the housing and operatively connected to the motion detecting system. The motion detecting system includes a plurality of motion detector assemblies having a corresponding plurality of fields of view looking in different directions away from the housing and extending over and covering the zones of the venue. The motion detector assemblies detect levels of motion of the targets in the zones. The RFID locationing system reads the targets configured as RFID tags to locate the RFID tags in the zones in response to the motion levels detected by the motion detector assemblies.

A network server is operatively connected to the motion detecting system and the RFID locationing system. The RFID locationing system reads the RFID tags in a reading mode of operation with a set of reading parameters, and an RFID controller of the RFID locationing system changes at least one of the reading parameters based on the motion levels detected by the motion detector assemblies. For example, the RFID controller at least partially deenergizes, or controls, the RFID locationing system to not read any RFID tags, or to read fewer RFID tags, when no or zero, or a reduced level of, motion is detected by the motion detector assemblies, and changes at least one of the reading parameters, e.g., a dwell time in which an RF signal transmitted by the RFID system reads each RFID tag, based on the motion level detected by the motion detector assemblies. Thus, a high detected level of motion caused by many moving RFID tags or other moving objects, will cause the RFID controller to increase the dwell time, and vice versa. Other reading parameters that can be changed include, but are not limited to, a transmit power at which the RF signal is transmitted, and/or a transmit direction along which the RF signal is transmitted, and/or a firing order of a plurality of RF signals that are transmitted by a plurality of RFID antenna elements of the RFID locationing system.

Advantageously, the housing has an outer wall bounding an upright or vertical axis, and the RFID antenna elements are arranged about the upright axis. The motion detector assemblies include a plurality of motion detector elements and a corresponding plurality of lenses, both being also arranged about the upright axis. Preferably, each motion detector assembly includes a non-image-based, and non-image-recordable, discrete detector and a Fresnel lens.

A further aspect of this disclosure is directed to a method of locating targets in a venue having a plurality of zones. The method is performed by mounting a housing overhead in the venue, by detecting levels of motion of the targets in the zones by supporting on the housing a plurality of motion detector assemblies having a corresponding plurality of fields of view looking in different directions away from the housing and extending over and covering the zones of the venue, and by reading the targets configured as radio frequency (RF) identification (RFID) tags to locate the RFID tags in the zones in response to the motion levels detected by the motion detector assemblies by supporting an RFID locationing system on the housing.

In accordance with this disclosure, the motion detector assemblies provide additional control, information, and feedback to the RFID locationing system to improve its tag locationing performance. When the motion detector assemblies detect no or zero, or a reduced level of, activity in a particular zone of the venue, there is no or little reason for the RFID locationing system in that zone to operate at full performance, and, therefore, it can be at least partially deenergized, thereby conserving server bandwidth and server processing resources. As the motion detector assemblies detect greater and greater levels of activity in a particular zone of the venue, then the aforementioned dwell time can be proportionally directly increased to accommodate the greater levels of motion, and vice versa, thereby optimizing the tag locationing performance of the motion-controlled, RFID locationing system.

Turning now to the drawings, reference numeral 10 in FIG. 1 generally depicts a warehouse environment or venue in which a plurality of sensing network units 30 for sensing targets is mounted overhead. As described below in connection with FIG. 5, the venue 10 may have zones or shelves 92, 94, 96, 98 spaced apart from one another. Advantageously, the sensing network units 30 can be installed every twenty to eighty feet or so in a square grid. As described below, each sensing network unit 30 has a motion detecting system 32 for detecting levels of motion of the targets in the zones 92, 94, 96, 98, and a radio frequency (RF) identification (RFID) locationing system 34 operative for reading the targets configured as RFID tags.

Each product 12, shown in FIG. 1 as a carton for simplicity, is tagged with an RFID tag, preferably a passive RFID tag, for cost reasons, and, in some applications, an RFID tag may be associated with a pallet or a container for multiple products 12. An RFID tag may also be associated with a badge worn by people 24, or with mobile devices 110, such as handheld RFID tag readers, handheld bar code symbol readers, phones, radios, watches, tablets, radios, or computers, which are carried and/or worn by the people 24 as they move within the venue 10, or even with product movers, such as trucks or forklifts 22, movable within the venue 10, for moving the products 12. As further shown in FIG. 5, the aforementioned shelves 92, 94 are described hereinafter as "busy" shelves, because there are many products 12, and/or people 24, and/or mobile devices 110, and/or product movers 22 in motion at these zones, whereas shelves 96, 98 are described hereinafter as "idle" shelves, because there are no, or fewer, products 12, and/or people 24, and/or mobile devices 110, and/or product movers 22 in motion at these zones.

A network host computer or server 14, typically locally located in a backroom at the venue 10, comprises one or more computers and is in wired, wireless, direct, or networked communication with each sensing network unit 30. The server 14 may also be remotely hosted in a cloud server. The server 14 may include a wireless RF transceiver that communicates with each sensing network unit 30. For example, Wi-Fi and Bluetooth® are open wireless standards for exchanging data between electronic devices. The server 14 is connected to the motion detecting system 32 and the RFID locationing system 34 in each sensing network unit 30. As diagrammatically shown by the dashed lines 20 in FIG. 1, three of the sensing network units 30 can be used to locate a product 12 in the venue 10 by triangulation or trilateration, as well as a route, shown by dashed lines 16, along which a product 12 has traveled.

Figure 2:
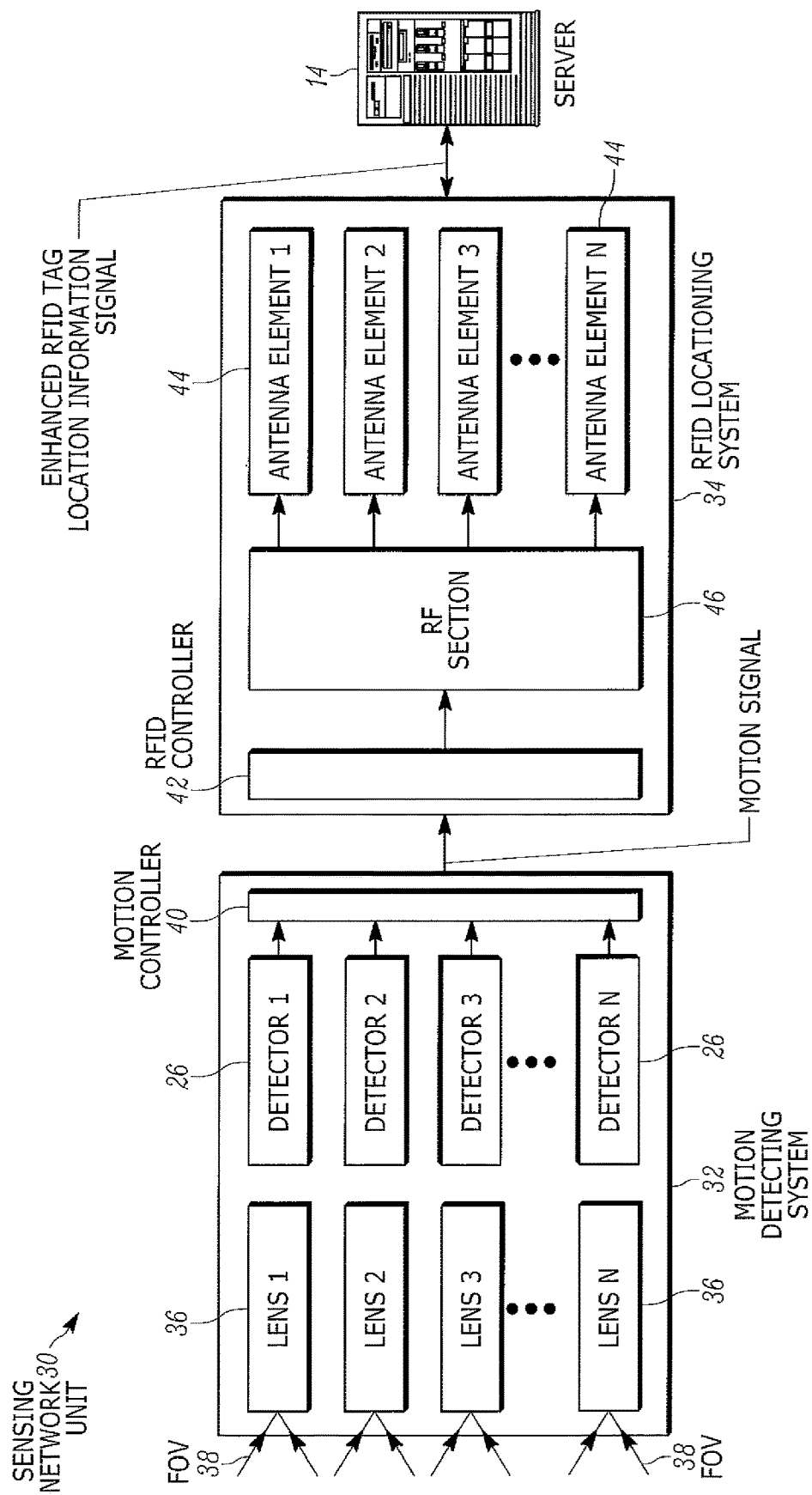
FIG. 2 is a block diagram view of a motion detecting system and an RFID locationing system mounted in each overhead sensing network unit of FIG. 1.

As best shown in FIG. 2, each motion detecting system 32 includes a plurality of motion detector assemblies, each having a plurality of motion detectors 1, 2, 3 . . . , N, each generally identified by the reference numeral 26, and a corresponding plurality of focusing lenses 1, 2, 3 . . . , N, each generally identified by the reference numeral 36. The number N is arbitrary and depends on the particular application. The motion detector assemblies have a corresponding plurality of fields of view (FOV) 38 looking in different directions, both in azimuth and elevation, away from each overhead network sensing unit 30 and extending over and covering the zones 92, 94, 96, 98 of the venue 10. The motion detector assemblies detect levels of motion of targets, e.g., products 12, and/or people 24, and/or mobile devices 110, and/or product movers 22 in the zones 92, 94, 96, 98, and are connected to a motion processor or controller 40, which, in turn, sends a motion signal indicative of motion in a particular zone to an RFID processor or controller 42 of the RFID locationing system 34.

As also shown in FIG. 2, each RFID locationing system 34 has a plurality or array of antenna elements 1, 2, 3 . . . , N, each generally identified by the reference numeral 44, and connected to an RF section 46, which, in turn, is connected to the RFID controller 42 to control its operation. The number N is arbitrary and depends on the particular application. The RFID controller 42 steers interrogation beams 28 (see FIG. 5) radiated by the antenna elements 44 over the tags in the zones of the venue, and, in combination with the motion signal, locates the RFID tags in a particular zone in response to the motion level detected by a particular motion detector assembly by sending an enhanced RFID tag location information signal to the server 14 for processing.

More particularly, the RF section 46 includes control and processing electronics that is operatively connected to the antenna elements 44, for energizing the antenna elements 44 in a firing order. The RF section 46 includes an RF transceiver operated, under the control of the RFID controller 42, to form and steer an interrogating RF beam 28 (see FIG. 5) across, and interrogate and process the payloads of, any RFID tags that are in its coverage range. It will be understood that there may be thousands of RFID tags in the venue 10. The antenna elements 44 receive a return RF beam from the interrogated tag(s), and the RFID controller 42 decodes an RF signal from the return RF beam into decoded data. The decoded data, also known as a payload or captured target data, can denote a serial number, a price, a date, a destination, a location, other attribute(s), or any combination of attributes, and so on, for the tagged target.

Figure 3:
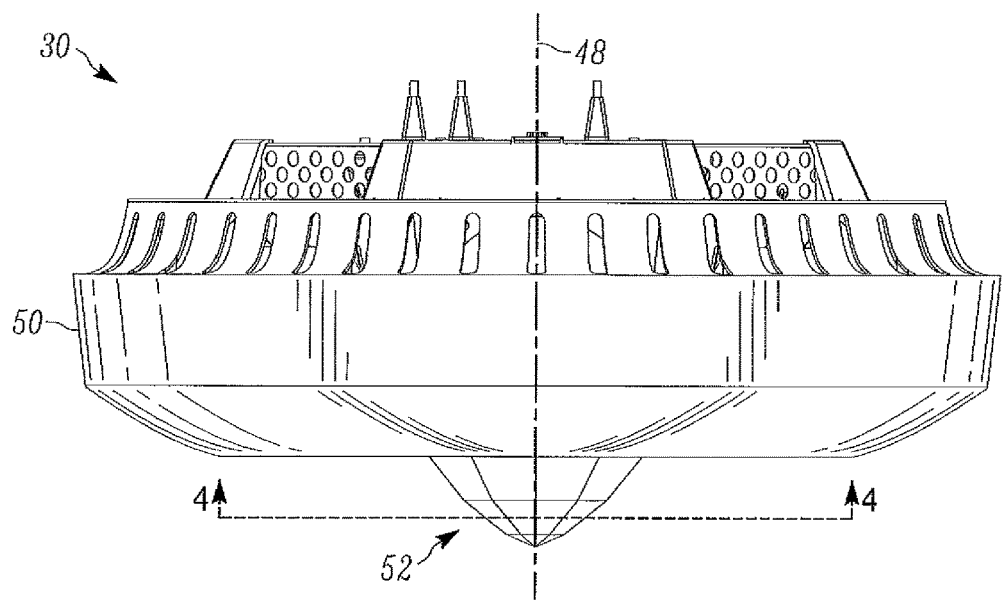
FIG. 3 is an enlarged, elevational view of each overhead sensing network unit of FIG. 1.

A preferred embodiment of each sensing network unit 30 is depicted in FIG. 3. Each unit 30 has a generally circular, hollow, common housing 50 mounted at an overhead location in a zone of the venue 10. A multi-faceted, segmented dome 52 is mounted at the bottom of the housing 50. The housing 50 and the dome 52 are both symmetrical with an upright, vertical axis 48. The housing 50 supports all the components of the motion detecting system 32 and the RFID locationing system 34.

Figure 4:
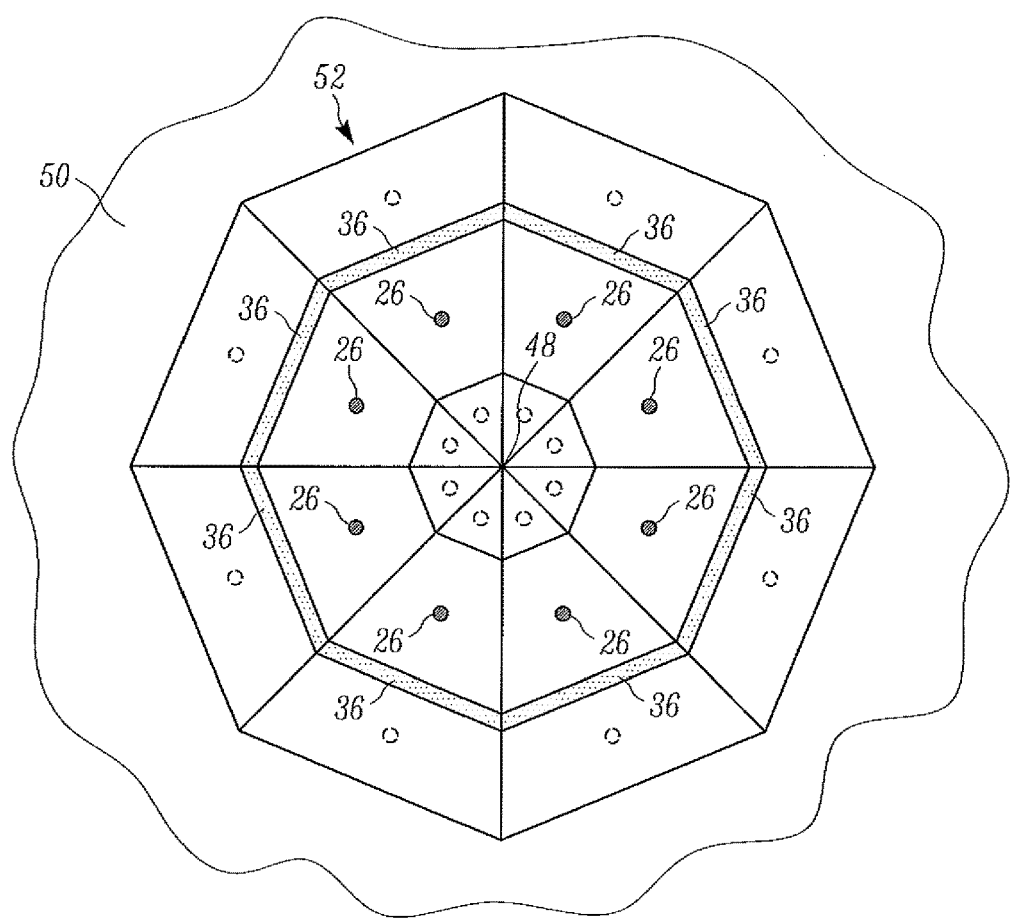
FIG. 4 is a sectional view taken on line 4-4 of FIG. 3.
Figure 5:
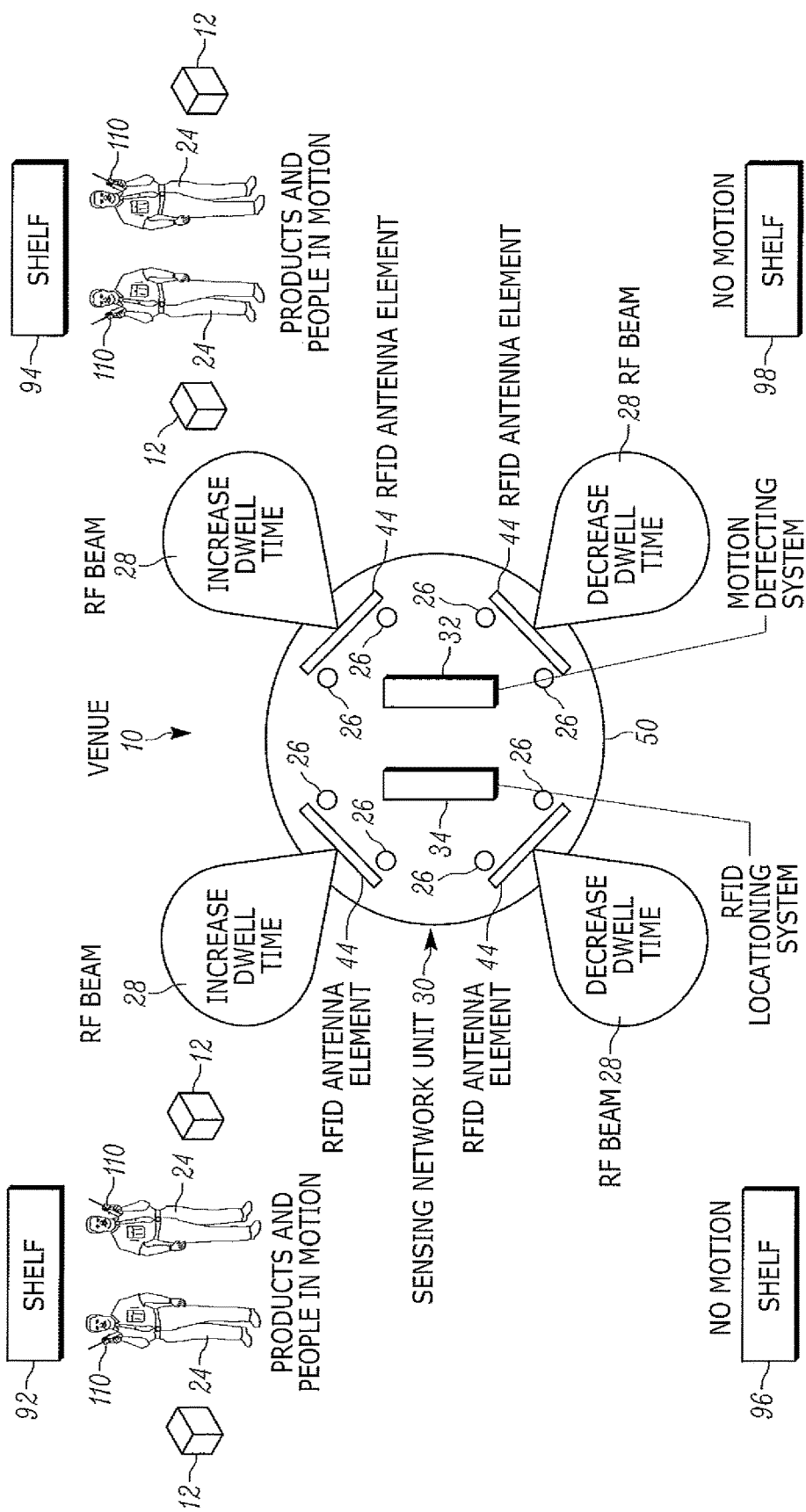
FIG. 5 is a diagrammatic top plan view depicting one example of how the performance of an RFID locationing system can be improved at a representative sensing network unit.

As best shown in FIG. 5, the RF antenna elements 44 are mounted inside the housing 50 and are arranged, preferably equiangularly spaced apart, about the upright axis 48. The housing 50 covers the RF antenna elements 44 and acts as a radome to protect them. The housing 50 is constituted of a material, such as plastic, through which RF signals can readily pass. As best shown in FIGS. 4-5, the motion detectors 26 are also mounted inside the housing 50 and are arranged, preferably equiangularly spaced apart, about the upright axis 48. The focusing lenses 36 are advantageously configured to be integral with the multi-faceted dome 52, that is, each facet constitutes a focusing lens 36, and all the lenses 36 are arranged, preferably equiangularly spaced apart, about the upright axis 48.

As illustrated, the dome 52 has three levels, and each level has eight motion detectors 26 and eight lenses 36. This disclosure is not intended to be limited to such numerical values, because there can be a different number of levels, and a different number of detectors 26 and lenses 36 at each level. Also, each lens 36 need not be planar as illustrated, but could be curved. In addition, the lenses 36 can be discrete elements, and not integrated with one another in a one-piece construction. Advantageously, each motion detector 26 is a non-image-based, and non-image-recordable, discrete detector, and each lens 36 is a Fresnel lens.

In accordance with this disclosure, the motion detecting system 32 provides additional control, information, and feedback to the RFID locationing system 34 to improve its tag locationing performance. The motion detectors 26 in each unit 30 monitor the motion level of any targets in their imaging FOVs 38 or zones 92, 94, 96, 98 in the venue 10. When the motion detectors 26 detects no or zero, or a reduced level of, motion in a particular zone of the venue 10, e.g., at idle shelves 96, 98, then there is no, or little, reason for the RFID locationing system 34 in that zone to operate to capture target data at full performance, and, therefore, it can be at least partially deenergized by the RFID controller 42, thereby conserving server bandwidth and processing resources. As the motion detectors 26 detect greater and greater levels of motion in a particular zone of the venue 10, e.g., at busy shelves 92, 94, then the operation of the RFID locationing system 34 in that zone is modified by the RFID controller 42 to accommodate the greater levels of motion, and vice versa, thereby optimizing the tag locationing performance of the motion-controlled, RFID locationing system 34. Thus, the motion detecting system 32 and the RFID locationing system 34 mutually cooperate with other to accurately locate the targets.

For example, the RFID locationing system 34 reads the RFID tags in a reading mode of operation with a set of reading parameters or settings. One such reading parameter is the duration of a dwell time of an RF interrogation signal transmitted by the RFID locationing system 34. The dwell time is the length of time that an RFID tag stays in the field of the RF interrogation beam 28. The RFID controller 42 varies the dwell time, or any other reading parameter or setting, based on the motion level detected by the motion detecting system 32. Thus, a higher detected level of activity, e.g., more motion caused by many moving targets, for example, at busy shelves 92, 94, will cause the RFID controller 42 to directly proportionately increase the dwell time, or any other reading parameter, and vice versa. Other reading parameters that can be changed include, but are not limited to, a transmit power at which the RF signal is transmitted, and/or a transmit direction along which the RF signal is transmitted, and/or a firing order of a plurality of RF signals that are transmitted by the RF antenna elements 44. Any one or more of such reading parameters can be varied in any combination.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An arrangement for locating targets in a venue having a plurality of zones, the arrangement comprising:
   a housing mounted overhead in the venue;
   a motion detecting system supported by the housing and including a plurality of motion detector assemblies having a corresponding plurality of fields of view looking in different directions away from the housing and extending over and covering the zones of the venue, the motion detector assemblies being operative for detecting levels of motion of the targets in the zones;
   a radio frequency (RF) identification (RFID) locationing system supported by the housing and operatively connected to the motion detecting system, the RFID locationing system being operative for reading the targets configured as RFID tags to locate the RFID tags in the zones in response to the motion levels detected by the motion detector assemblies; and
   an RFID controller operatively connected to the motion detecting system,
   wherein the RFID locationing system is operative for reading the RFID tags in a reading mode of operation with a set of reading parameters,
   wherein the RFID controller changes at least one of the reading parameters based on the motion levels detected by the motion detector assemblies, and
   wherein the reading parameters include a dwell time of an RF interrogation signal transmitted by the RFID locationing system, a transmit power at which the RF interrogation signal is transmitted, a transmit direction along which the RF interrogation signal is transmitted, and a firing order of a plurality of RF interrogation signals that are transmitted by the RFID locationing system.

2. The arrangement of claim 1, wherein the RFID controller controls the RFID locationing system to read fewer RFID tags when reduced levels of motion are detected by the motion detector assemblies, and changes at least one of the reading parameters in which the RFID tags are read based on the motion levels detected by the motion detector assemblies.

3. The arrangement of claim 1, wherein the RFID controller controls the RFID locationing system to read more RFID tags when increased levels of motion are detected by the motion detector assemblies, and changes at least one of the reading parameters in which the RFID tags are read based on the motion levels detected by the motion detector assemblies.

4. The arrangement of claim 1, wherein the housing has an outer wall bounding an upright axis; wherein the RFID locationing system includes a plurality of RFID antenna elements arranged about the upright axis and supported by the housing; and wherein the motion detector assemblies include a plurality of motion detector elements and a corresponding plurality of lenses, both arranged about the upright axis and supported by the housing.

5. The arrangement of claim 1, wherein each motion detector assembly includes a non-image-based, and non-image-recordable, discrete detector.

6. A motion-controlled arrangement for locating targets in a venue having a plurality of zones, the arrangement comprising:
   a plurality of housings mounted overhead in the venue;
   a plurality of motion detecting systems, each supported by a respective housing, each motion detecting system including a plurality of motion detector assemblies having a corresponding plurality of fields of view looking in different directions away from the respective housing and extending over and covering the zones of the venue, the motion detector assemblies being operative for detecting levels of motion of the targets in the zones; and
   a plurality of radio frequency (RF) identification (RFID) locationing systems, each supported by a respective housing and being operatively connected to the respective motion detecting system supported by the respective housing, each RFID locationing system being controlled by an RFID controller and being operative for reading the targets configured as RFID tags to locate the RFID tags in the zones in response to the motion levels detected by the motion detector assemblies,
   wherein each RFID locationing system is operative for reading the RFID tags in a reading mode of operation with a set of reading parameters,
   wherein the RFID controller changes at least one of the reading parameters based on the motion levels detected by the motion detector assemblies, and
   wherein the reading parameters include a dwell time of an RF interrogation signal transmitted by each RFID locationing system, a transmit power at which the RF interrogation signal is transmitted, a transmit direction along which the RF interrogation signal is transmitted, and a firing order of a plurality of RF interrogation signals that are transmitted by each RFID locationing system.

7. The motion-controlled arrangement of claim 6, wherein each housing has an outer wall bounding an upright axis; wherein each RFID locationing system includes a plurality of RFID antenna elements arranged about the upright axis and supported by the respective housing; and wherein the motion detector assemblies include a plurality of motion detector elements and a corresponding plurality of lenses, both arranged about the upright axis and supported by the respective housing.

8. The motion-controlled arrangement of claim 6, wherein each motion detector assembly includes a non-image-based, and non-image-recordable, discrete detector.

9. A method of locating targets in a venue having a plurality of zones, the method comprising:
   mounting a housing overhead in the venue;
   detecting levels of motion of the targets in the zones by supporting on the housing a plurality of motion detector assemblies having a corresponding plurality of fields of view looking in different directions away from the housing and extending over and covering the zones of the venue;
   reading the targets configured as radio frequency (RF) identification (RFID) tags to locate the RFID tags in the zones in response to the motion levels detected by the motion detector assemblies by supporting an RFID locationing system on the housing, wherein the reading of the RFID tags is performed in a reading mode of operation with a set of reading parameters;
   changing at least one of the reading parameters based on the motion levels detected by the motion detector assemblies; and
   reading fewer RFID tags when reduced levels of motion are detected by the motion detector assemblies.

10. The method of claim 9, and reading more RFID tags when increased levels of motion are detected by the motion detector assemblies.

11. The method of claim 10, and configuring the reading parameters to include a dwell time of an RF interrogation signal transmitted by the RFID locationing system, a transmit power at which the RF interrogation signal is transmitted, a transmit direction along which the RF interrogation signal is transmitted, and a firing order of a plurality of RF interrogation signals that are transmitted by the RFID locationing system.

12. The method of claim 9, and configuring the housing with an outer wall bounding an upright axis; and configuring the RFID locationing system with a plurality of RFID antenna elements arranged about the upright axis and supported by the housing; and configuring the motion detector assemblies with a plurality of motion detector elements and a corresponding plurality of lenses, both arranged about the upright axis and supported by the housing.

13. The method of claim 9, and configuring the each motion detector assembly with a non-image-based, and non-image-recordable, discrete detector.

14. An arrangement for locating targets in a venue having a plurality of zones, the arrangement comprising:
   a housing mounted overhead in the venue;
   a motion detecting system supported by the housing and including a plurality of motion detector assemblies having a corresponding plurality of fields of view looking in different directions away from the housing and extending over and covering the zones of the venue, the motion detector assemblies being operative for detecting levels of motion of the targets in the zones;
   a radio frequency (RF) identification (RFID) locationing system supported by the housing and operatively connected to the motion detecting system, the RFID locationing system being operative for reading the targets configured as RFID tags to locate the RFID tags in the zones in response to the motion levels detected by the motion detector assemblies; and an RFID controller operatively connected to the motion detecting system, wherein the RFID locationing system is operative for reading the RFID tags in a reading mode of operation with a set of reading parameters, and wherein the RFID controller changes at least one of the reading parameters based on the motion levels detected by the motion detector assemblies, and wherein the RFID controller controls the RFID locationing system to read fewer RFID tags when reduced levels of motion are detected by the motion detector assemblies, and changes at least one of the reading parameters in which the RFID tags are read based on the motion levels detected by the motion detector assemblies.

15. An arrangement for locating targets in a venue having a plurality of zones, the arrangement comprising:

a housing mounted overhead in the venue;

a motion detecting system supported by the housing and including a plurality of motion detector assemblies having a corresponding plurality of fields of view looking in different directions away from the housing and extending over and covering the zones of the venue, the motion detector assemblies being operative for detecting levels of motion of the targets in the zones;

a radio frequency (RF) identification (RFID) locationing system supported by the housing and operatively connected to the motion detecting system, the RFID locationing system being operative for reading the targets configured as RFID tags to locate the RFID tags in the zones in response to the motion levels detected by the motion detector assemblies; and an RFID controller operatively connected to the motion detecting system, wherein the RFID locationing system is operative for reading the RFID tags in a reading mode of operation with a set of reading parameters, and wherein the RFID controller changes at least one of the reading parameters based on the motion levels detected by the motion detector assemblies, and wherein the RFID controller controls the RFID locationing system to read more RFID tags when increased levels of motion are detected by the motion detector assemblies, and changes at least one of the reading parameters in which the RFID tags are read based on the motion levels detected by the motion detector assemblies.

* * * * *